United States Patent
Oelsner

(10) Patent No.: US 9,455,954 B2
(45) Date of Patent: Sep. 27, 2016

(54) REMOTE DIAGNOSIS SYSTEM AND METHOD AND PRINTING MACHINE HAVING THE SYSTEM

(75) Inventor: Tom Oelsner, Frankfurt am Main (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1540 days.

(21) Appl. No.: 11/122,877

(22) Filed: May 4, 2005

(65) Prior Publication Data

US 2005/0249200 A1    Nov. 10, 2005

(30) Foreign Application Priority Data

May 4, 2004 (DE) .......................... 10 2004 022 216

(51) Int. Cl.

| | |
|---|---|
| H04L 29/06 | (2006.01) |
| B41F 33/00 | (2006.01) |
| G06F 21/60 | (2013.01) |
| G06F 21/62 | (2013.01) |
| H04L 12/28 | (2006.01) |

(52) U.S. Cl.
CPC ....... *H04L 63/0209* (2013.01); *B41F 33/0009* (2013.01); *G06F 21/608* (2013.01); *G06F 21/6218* (2013.01); *H04L 12/2856* (2013.01); *H04L 12/2865* (2013.01); *H04L 12/2898* (2013.01)

(58) Field of Classification Search
USPC .......................................... 709/229; 370/356
See application file for complete search history.

(56) References Cited

U.S. PATENT DOCUMENTS

| | | | |
|---|---|---|---|
| 5,325,156 A | 6/1994 | Ulinski | |
| 5,778,174 A * | 7/1998 | Cain | 726/11 |
| 5,881,226 A | 3/1999 | Veneklase | |
| 5,903,833 A * | 5/1999 | Jonsson | H04M 3/42263 455/417 |
| 6,795,205 B1 * | 9/2004 | Gacek | 358/1.15 |
| 7,313,699 B2 * | 12/2007 | Koga | 713/170 |
| 7,478,124 B2 * | 1/2009 | Huang | 709/203 |
| 7,606,880 B2 * | 10/2009 | Shima | 709/220 |
| 2002/0078141 A1 | 6/2002 | Cohen et al. | 709/203 |
| 2002/0169980 A1 * | 11/2002 | Brownell | H04L 63/029 726/4 |
| 2003/0110273 A1 * | 6/2003 | Ventura | 709/229 |

(Continued)

FOREIGN PATENT DOCUMENTS

| | | |
|---|---|---|
| DE | 10147147 A1 | 4/2003 |
| EP | 0 599 523 B1 | 6/1994 |
| EP | 0 844 551 A2 | 5/1998 |
| JP | 2001350724 A | 12/2001 |

(Continued)

OTHER PUBLICATIONS

Microsoft Press. Microsoft Computer Dictionary. Redmond: Microsoft P, 2002.*

*Primary Examiner* — Sulaiman Nooristany
(74) *Attorney, Agent, or Firm* — Laurence A. Greenberg; Werner H. Stemer; Ralph E. Locher

(57) ABSTRACT

A system and a method initiate a data transmission from a first computer to at least a second computer or approve access to the data on a first computer by a second computer. The computers are interconnected through a network connection. The first computer is protected against access through the network connection by a firewall. Another communication connection, which the first computer does not use for transmitting data, is provided for initiating the access authorization to the first computer or the data transmission from the first computer to at least the second computer. A printing machine is provided with the system.

6 Claims, 1 Drawing Sheet

(56) References Cited

U.S. PATENT DOCUMENTS

2003/0159031 A1* 8/2003 Muller ............ G06F 21/00
 713/155
2004/0255035 A1 12/2004 Klaghofer et al.

FOREIGN PATENT DOCUMENTS

| JP | 2002032342 A | 1/2002 |
| WO | 98/02991 | 1/1998 |
| WO | 01/15379 A1 | 3/2001 |

\* cited by examiner

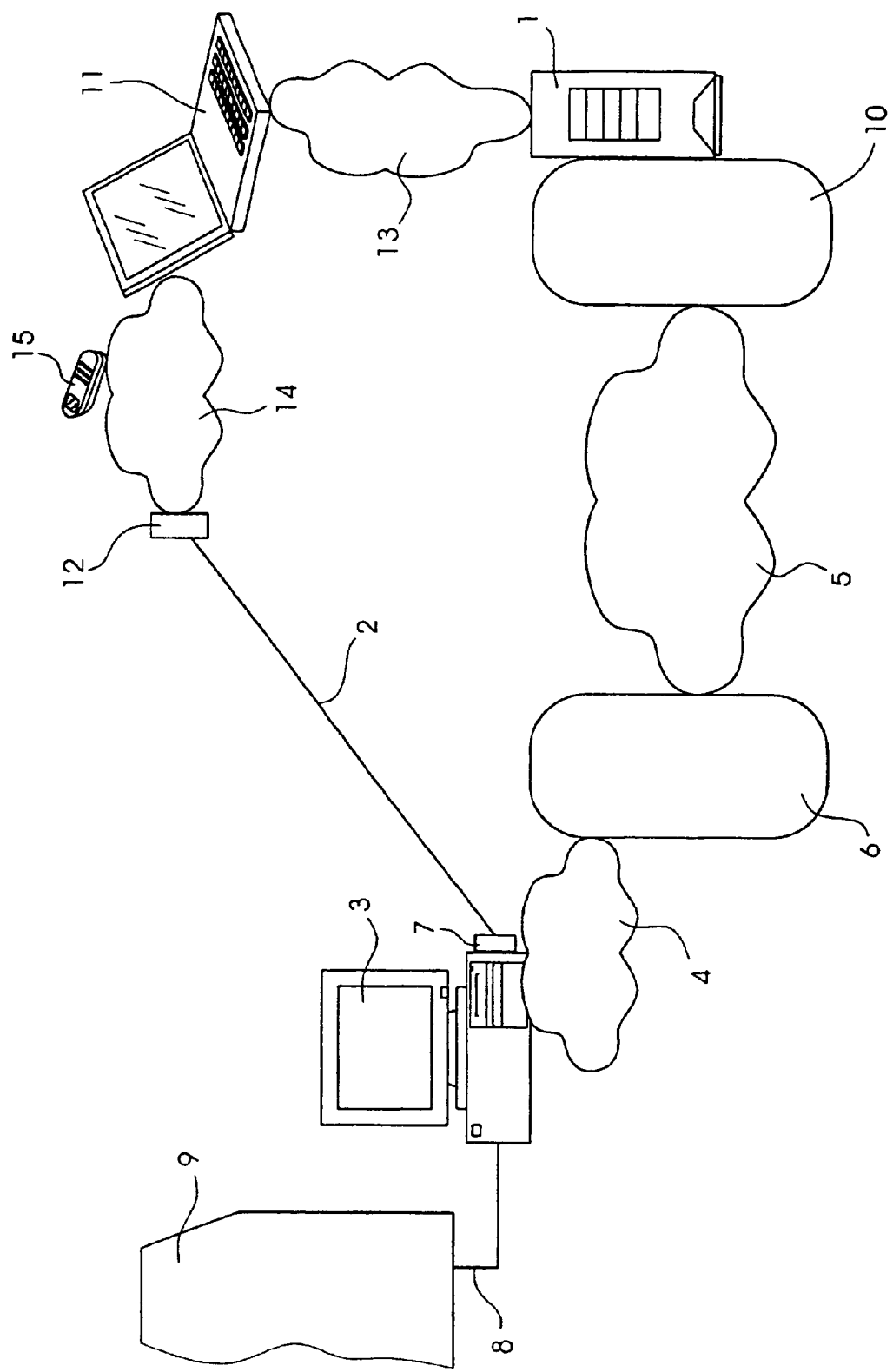

REMOTE DIAGNOSIS SYSTEM AND METHOD AND PRINTING MACHINE HAVING THE SYSTEM

BACKGROUND OF THE INVENTION

Field of the Invention

The invention relates to a system and a method for initiating a data transmission from a first computer to at least a second computer or approving access to data on a first computer by a second computer, the computers being connected to one another through a network connection. The invention also relates to a printing machine having the system.

In recent years, the graphics industry has increasingly encountered a trend for machines which process printed material, such as printing machines and folding machines, to be provided with computer controllers and for machine stock or equipment in a printing works or plant to be networked. The computer controllers which are thus provided anyway have furthermore been used for several years for allowing maintenance and diagnosis by the manufacturer of the machines for processing printed material. The machines for processing printed material usually have a computer capable of making contact, through a telephone connection or an internet connection, with a maintenance and diagnosis computer at the premises of the manufacturer of the machine in question. In that way, data from the machine stock or equipment in a printing works can then be transmitted to the manufacturer of the corresponding machines and can be analyzed by that manufacturer. If a problem is readily solvable, the manufacturer can provide the operator of the paper-processing machines with appropriate support by telephone, and the operator can himself or herself use that support for solving the problem which has arisen.

It is also possible, under certain conditions, to use an internet connection to transmit data for solving a problem from the manufacturer to the control computer for the machine which processes printed material. A system which sets up such a maintenance call is known, inter alia, from European Patent EP 0 599 523 B1, corresponding to U.S. Pat. No. 5,325,156. That disclosure relates to copiers which allow the operator of a copier to set up a call to the manufacturer or the latter's servicing personnel in order to implement maintenance plans and solve problems. In that case, the copier has a computer with a memory which firstly stores the identity of the copier and secondly stores a type of protocol for the machine data stored over a particular period of time as machine status information. When the operator of the copier presses a particular button on the machine, a data connection to the manufacturer is set up which automatically transmits the identity of the copier and the present machine status to the manufacturer. As a result, the manufacturer knows immediately which machine and which customer has had which problems or maintenance events arise, and he or she can thus react specifically and quickly and take suitable measures.

In addition, interactive diagnosis systems which allow servicing engineers remote access to machines are known in the prior art. However, those interactive systems have a drawback in that the connection setup and therefore the access to the machine need to be effected by the servicing engineer, who takes action on the machine as a reaction to reports of fault or failure. In contrast, however, data-driven diagnosis and maintenance systems have the characteristic or feature that the maintenance or diagnosis operation always needs to be initiated by the operator of the printed material processing machine. That is initially also useful to the operator because he or she absolutely wishes to prevent unauthorized access to his or her respective machine and the data thereof, by third parties. That applies particularly when the computer controller for the printed material processing machine connects to the manufacturer's computer for the purpose of maintenance or diagnosis through the intranet and the internet. In that case, the intranet of the operator of the printed material processing machine is usually connected to the internet through a "firewall" for security reasons. The firewall serves to prevent unauthorized users from intruding into the intranet from the internet. That is particularly important for repelling computer viruses and hacker attacks from the outside. For that reason, the operators of the machine for processing printed material also insist that the firewall not be rendered penetrable for purposes of maintenance and diagnosis devices. However, that also prevents manufacturers from taking the initiative for maintenance and diagnosis requests, because the manufacturer cannot access the intranet and the computer for the machine for processing printed material from the outside through the firewall through the internet. Since that problem has already become known, the prior art has approaches for solving the problem by having a computer controller for the machine for processing printed material execute a program which sets up a connection to the manufacturer automatically at particular intervals of time or in connection with the occurrence of particular events, such as the occurrence of errors or other problems in the machine for processing printed material. However, even with that practice, the manufacturer is bound or forced to wait for a connection to be set up by the computer controller of the customer's installed machines which process printed material and to be able to react only then. It is thus not possible, in the case of the heretofore known maintenance and diagnosis systems, for the manufacturer to initiate a maintenance and diagnosis operation for requesting data from the computer controller at arbitrary intervals of time for the purpose of remote maintenance on machines which process printed material without weakening protective measures from the operator of the machines, such as a firewall.

SUMMARY OF THE INVENTION

It is accordingly an object of the invention to provide a remote diagnosis system and method and a printing machine having the system, which overcome the hereinafore-mentioned disadvantages of the heretofore-known devices and methods of this general type and which provide a way for authorized personnel belonging to the manufacturer of a machine for processing printed material to access at arbitrary times the control computer of the machine installed on a customer's premises while maintaining the paradigm that the diagnosis operation is always started from the customer end.

With the foregoing and other objects in view, there is provided, in accordance with the invention, a system for either initiating a data transmission from a first computer to at least a second computer or approving access to data on a first computer by a second computer, the computers being connected to one another through a network connection. The system comprises a firewall for protecting the first computer against access through the network connection. A second communication connection through which data is not transmitted by the first computer serves for initiating the access authorization to the first computer or the data transmission from the first computer to at least the second computer.

In accordance with another feature of the invention, the system second communication connection is provided through a telephone network.

In accordance with a further feature of the invention, the system further includes equipment selected from the group consisting of a modem and an integrated services digital network (ISDN) card for connecting the first computer to the telephone network.

In accordance with an added feature of the invention, the system includes equipment selected from the group consisting of the second computer and another communication appliance provided for sending a call signal through the second communication connection for initiating on the first computer the access authorization or the data transmission from the first computer to at least the second computer.

In accordance with an additional feature of the invention, the call signal is a particularly selected call signal for initiating the data transmission.

In accordance with yet another feature of the invention, the system further includes at least a third computer connected to the second computer through a second intranet.

In accordance with yet a further feature of the invention, the third computer is provided for setting up a telephone connection.

With the objects of the invention in view, there is also provided a printing machine comprising a system for either initiating a data transmission from a first computer to at least a second computer or approving access to the data on a first computer by a second computer. The computers are connected to one another through a network connection, including a firewall for protecting the first computer against access through the network connection. A second communication connection through which data is not transmitted by the first computer serves for initiating the access authorization to the first computer or the data transmission from the first computer to at least the second computer.

With the objects of the invention in view, there is additionally provided a method for initiating a data transmission from a first computer to at least a second computer or for approving access to the data on a first computer by a second computer. The computers are connected to one another through a network connection. The method includes protecting the first computer by a firewall against access through the network connection. The access authorization to the first computer or the data transmission from the first computer to at least the second computer is initiated through a second communication connection through which data is not transmitted by the first computer.

In accordance with another mode of the invention, the method further includes providing the access to the data on the first computer or the data transmission to the second computer through the network connection.

In accordance with a further mode, the method of the invention further includes issuing a call signal in the communication connection, which is a telephone network, for initiating the access authorization or the data transmission.

In accordance with an added mode, the method of the invention further includes checking the call signal by the first computer for admissibility and, if the call signal is evaluated as inadmissible, then providing no access and no data transmission to the second computer.

In accordance with a concomitant mode, the method of the invention further includes setting up the data transmission only to a selected and predefined second computer.

Thus, the system according to the invention includes a first computer which is connected to a second computer through a network connection. It is additionally possible to set up, beside the network connection, a second further communication connection, which is separate from the network connection, to the first computer. The second communication connection for initiating the data transmission can be set up from the second computer or from another communication appliance. In this regard, the first computer is usually the control computer for a printing machine or other machine or a separate computer which is connected to a machine of this type and which can use the intranet of the respective machine operator or the internet directly to set up a network connection to a second computer, which is installed on the premises of the manufacturer of the machine, for example. This second computer or a further computer connected thereto is operated by the manufacturer's maintenance and servicing personnel, who are thus able to retrieve data from the machine's first computer, to then analyze it and to provide appropriate solutions if problems arise. For this purpose, data can also then be transmitted to the machine's first computer again from the manufacturer's second computer and can remedy the errors and problems which have arisen.

Since the network connection is usually protected by a firewall, it is not possible to use this network connection to start a data transmission from the second or from a further computer, because the firewall does not allow this access to the first computer of the machine. This can be done by using the separate communication connection, however, which is set up, for example specially, just for maintenance and diagnosis purposes and is thus accessible only to the manufacturer of the printing machine and to the operator of the printing machine. Such a communication connection is thus protected against influence by third parties and can then also be used to initialize the data request from the manufacturer's second computer, because in this case there is no risk of third parties being able to perform this data request on the first computer of the customer's printing machine without authorization.

In the case of the first refinement or feature of the invention, the network connection is routed from the first computer to at least the second computer through a firewall. Since the network connection is normally routed through the internet, it is necessary to use a firewall and encryption technology to protect this network connection against unauthorized access to the first computer of the machine by third parties. A particularly high level of security is achieved by virtue of the network connection being able to reach just one stipulated target system, namely the second computer, for maintenance and diagnosis purposes. By contrast, the second communication connection cannot be used to transmit any data at all, which means that no protective measures for the data transport are required in that case.

Provision is also made for the second communication connection to be made through a telephone network. Since both the manufacturer, for example, of a printing machine, and the operator, for example, of a printing plant or works, have a telephone line available in principle, this is a simple way of setting up a second communication connection between the first computer and the second computer. In order to be able to set up a communication connection of this type, only the first computer and the second computer each have to have a modem or an ISDN card in order to be able to communicate through the telephone network in this manner. In this regard, it is possible to use commercially available computers, modems and ISDN cards, whereby the costs can be kept low. However, it is also possible for the data transmission to be initiated by calling a telephone or mobile telephone or cell-phone. In that case, the second computer does not necessarily have to be connected to the telephone network. In this context, unauthorized personnel should have no access to the initiating telephone.

In one particularly advantageous feature of the invention, the data transmission can be initiated on the first computer by sending a call signal through the second communication connection from a second computer or another communication appliance provided for this purpose. A call signal of this type, namely the first computer's telephone number, then serves for starting the data transmission. In this regard, the telephone number is known only to the operator of the machine and to the maintenance personnel.

An additional security measure is the subject matter of a further particularly advantageous feature of the invention, wherein the data transmission can be initiated only by particularly selected call signals. If the first computer and the second computer or the telephone are connected to one another through the telephone network, the connection setup through the internet between the first and second computers can be initiated only by having the second computer send to the first computer a bell signal or ringing sound which clearly identifies it and which possibly contains additional information besides the telephone number. The second computer or the telephone uses this bell signal to identify itself to the first computer. In this regard, it is believed to be readily apparent that it is necessary to ensure that the call signal from the second computer or from the telephone cannot easily be simulated by third parties, so that they can bypass the protective apparatus and finally can nevertheless access the first computer belonging to the operator of the printing machine. This is as good as prevented in the case of telephone networks, however, because the telephone numbers of large telecommunication companies are, by their very nature, allocated only once and can thus be clearly associated with a particular line. This means that such a bell signal associated with the telephone number is a secure way of identifying the second computer or the telephone to the first computer. In addition, by way of example, the modem or the ISDN card on the first computer then reacts only to the bell signal associated with this particular telephone number, whereas it does not react at all to other signals.

In addition, in a further feature of the invention, this bell signal can be used to perform just one particular firmly programmed instance of connection setup from the first computer to the second computer. This means that the data from the first computer can also be transmitted only to the second computer through the internet. They are not transmitted to another computer, for example, when there are unauthorized third parties. This is because, apart from the bell tones, the second communication connection, such as the telephone network, is not used to transmit any data. As soon as an attempt is made to transmit any other data through the second communication connection to the first computer of the machine for processing printed material, or to retrieve data from the first computer through the second communication connection, the first computer interrupts the connection. That is because there is no provision for such a request or such access in the system and therefore it represents a security violation, is automatically assessed as inadmissible access and is thus rejected.

It is also possible for at least a third computer to be connected to the second computer through a second intranet. In this case, the second computer is used as company-internal access to the data retrieved from the first computer. These data are also able to be transmitted to an authorized third computer within the second intranet. This means that each servicing employee has his or her own third computer, which he or she can use to retrieve the data from the machine currently being maintained through the second computer and the second intranet. However, all of the servicing employees' computers are forced to retrieve the data only through the second computer, because the data from the first computer of the machine which is to be maintained are sent only to this second computer. Assurance is thereby offered that the data on the first computer cannot be accessed by an unauthorized third computer which is not connected to the second intranet. If the servicing personnel's third computer is located outside of the second intranet, the data on the first computer can then no longer be accessed.

Other features which are considered as characteristic for the invention are set forth in the appended claims.

Although the invention is illustrated and described herein as embodied in a remote diagnosis system and method and a printing machine having the system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The FIGURE of the drawing is an illustration of a servicing system according to the invention having a first computer belonging to an operator of a machine for processing printed material, a second computer for maintaining the same machine as well as a third computer and a mobile telephone for initiating the maintenance operation.

DESCRIPTION OF THE PREFERRED EMBODIMENTS

Referring now to the single FIGURE of the drawing as a whole, there is seen a first computer 3 situated close to a printing machine or press 9 with which it can interchange data through a data connection 8. In principle, any other machine can also be maintained by using the system and method according to the invention if the machine is connected to a computer 3. Both the first computer 3 and the printing machine 9 are located in a printing plant or works, for example, and can be networked to further respective machines and computers within the printing plant, for example, through an in-house first intranet 4. The first computer 3 in the FIGURE can communicate with a second computer 1, through the intranet 4 within the printing plant and an internet access through the internet 5. The second computer 1 is, in this regard, preferably situated at the manufacturer's premises or at the premises of the company commissioned for maintaining the printing machine 9. This company is capable of setting up data communication between the first computer 3, which is associated with the printing machine 9, and the second computer 1. For reasons of security, the first intranet 4 at the printing plant or works is separated from the internet 5 by a firewall 6. This firewall 6 may be installed on the first computer 3 itself or on a non-illustrated interposed computer within the first intranet 4. The latter computer serves for controlling internet access.

It is consequently impossible, because of the firewall 6, to access the intranet 4 from the internet 5 without authorization. Such data interchange is possible only when the first computer 3 is used for actively setting up a data connection, which is why, in principle, the second computer 1 cannot be used to activate access to the first computer 3 through the internet 5. In addition, the first computer 3 is programmed so that it sends data through the internet 5 in encrypted form only to the firmly defined second computer 1. This is likewise intended to prevent unauthorized access to the data on the first computer 3 using extraneous computers, because only the second computer 1 is able to decrypt the data again. The second computer 1 is likewise set up so as to be protected from the internet 5 by a further firewall 10, and the statements made above relating to the first computer 3 likewise apply in this case in a corresponding manner.

It is necessary to set up another connection 2, so as to nevertheless allow the maintenance and servicing personnel to carry out maintenance and diagnosis work interactively at all times directly on the first computer 3. In accordance with the FIGURE of the drawing, this other connection 2 includes a telephone network, which directly or indirectly connects the first computer 3 to a third computer 11 and the second computer 1. However, either of the computers 1, 11 can be considered a second computer. In the FIGURE, the computers 3, 11 are connected to one another indirectly, because the servicing personnel are using the further third computer 11. So as not to be tied to a particular location, the third computer 11 is a laptop. The laptop 11 can use a second intranet 13, which is installed in the maintenance company, to set up an externally secure connection to the second computer 1. This means that the maintenance personnel can perform a maintenance operation from any location, which is within range of the second intranet 13.

In order to be able to use the telephone network 2 for communicating with the first computer 3, the FIGURE shows at least the first computer 3 connected to a modem 7. In addition, it is also possible for the laptop 11 to be connected to the telephone network 2 by an internal modem. Alternatively, a conventional telephone or a mobile telephone 15 (shown in the FIGURE) serves for initiating the data transmission on the first computer 3. In that case, the mobile telephone 15 in turn sets up a mobile radio link 14 to a mobile radio station 12, which is connected to the telephone network 2. The mobile telephone 15 may also be integrated as a mobile radio modem in the form of a global system for mobile communications (GSM) plug-in card in the laptop 11. In this case, a mobile radio link 14 to the telephone network 2 can be set up directly by using the laptop 11, as represented by the mobile radio cloud 14 shown in the FIGURE.

Even when the digital data transmission for the internet is likewise performed over the telephone network 2, for example when the data interchange takes place over a digital subscriber line (DSL) connection, the analog transmission through the telephone network 2 is nevertheless an entirely separate connection. That is because the analog signals from the telephone network 2 are totally separate from the DSL signals and only modems and telephones can be addressed by the analog signals. As an alternative, the computers 3, 11 may also be equipped with ISDN cards and may be connected to the digital telephone network 2 by an ISDN connection. Even in the case of an ISDN network, however, a digital data transmission by DSL would continue to be separate, because the DSL signals are also routed strictly separately by the ISDN signals, and the telephone signals are understood only by appropriately equipped receivers.

The connection through the telephone network 2 can serve for initiating a data request on the first computer 3 from the laptop 11 or mobile telephone 15 by dialing the telephone number associated with the telephone line from the modem 7 in the first computer 3 from the mobile telephone 15 or from the laptop 11. This telephone number is known only to the authorized maintenance personnel. The two telephone lines for the modem 7 and for the mobile telephone 15 or the laptop 11 are allocated by the operator of the telephone network 2 and thus cannot be altered. This means that the laptop 11 or the mobile telephone 15 can in turn use its firmly allocated telephone number to identify itself to the first computer 3, so as then to set up a data connection through the intranet 4 and the internet 5 upon correct identification. The broadband internet connection 5 can then be used to transmit the necessary data quickly from the first computer 3 through the second computer 1 to the laptop 11 belonging to the maintenance personnel.

If an attempt is made to set up the data request from another, unauthorized telephone line, the first computer 3 rejects this attempt because it recognizes the unauthorized telephone number and assesses it as invalid. No data transmission from the first computer 3 then takes place. Even if a third party were to be successful in simulating the telephone number of the laptop 11 or of the mobile telephone 15, however, the use of special security measures means that the third party would not be able to access the data easily on the first computer 3, because the telephone signal from the laptop 11 can be used only for initiating a precisely defined request operation which is firmly programmed in the first computer 3. This means that the identified bell signal can initiate just one request operation which transmits data from the first computer 3 to the second computer 2 and on to the laptop 11, because only this connection is programmed as admissible on the first computer 3. This is because it is not possible to send, through the telephone network 2 from the laptop 11 or mobile telephone 15, any data to the first computer 3 which could manipulate the first computer 3, because the modem 7 is used to evaluate only the bell signal but cannot receive any data. The modem thus does not accept a connection as in the case of a normal data interchange, but rather hangs up again immediately after receiving the bell signal. The system according to the invention thus provides a secure communication system in order to be able to initiate data requests and interactive access for maintenance and diagnosis purposes on computers 3 protected from the internet 5 by a firewall 6 at any time using an authorized terminal 11, 15, without any need for rendering the firewall 6 penetrable to attacks from the outside.

This application claims the priority, under 35 U.S.C. §119, of German Patent Application 10 2004 022 216.9, filed May 4, 2004; the entire disclosure of the prior application is herewith incorporated by reference.

I claim:

1. A method for either initiating a data transmission from a first computer, which is a control computer for a printing machine, to at least a second computer or approving access to data on a first computer by a second computer, the computers being connected to one another through a first network connection, with a firewall protecting the first computer against access through the first network connection and a second communication connection from the first computer not transmitting data from the first computer, the second communication being a phone connection, the method comprising:

the second communication connection organizing a first step of initiating the data transmission from the first computer to at least the second computer by initiating access authorization to the first computer by the second computer, realized via the very first data transfer of an authorization request to the first computer, with the very first data transfer of an authorization request being a call from the second computer with a fixed phone number to the first computer; and subsequent to the first step, the first computer checking a phone number of an incoming phone call from the second communication connection; and including equipment selected from the group consisting of the second computer and another communication appliance provided for sending a call signal through the second communication connection for initiating on the first computer the access authorization or the data transmission from the first computer to at least the second computer.

2. The method according to claim 1, further comprising equipment selected from the group consisting of a modem and an Integrated Services Digital Network (ISDN) card for connecting the first computer to the telephone network.

3. The method according to claim 1, wherein the call signal is a particularly selected call signal for initiating the data transmission.

4. The method according to claim 1, further comprising at least a third computer connected to the second computer through an intranet.

5. The method according to claim 4, wherein the third computer is provided for setting up a telephone connection.

6. A printing machine, comprising:
a system for either initiating a data transmission from a first computer to at least a second computer or approving access to the data on a first computer by a second computer, the computers being connected to one another through a first network connection, said system including:

a firewall for protecting the first computer against access through the first network connection; and a second communication connection from the first computer not transmitting data from the first computer, said second communication connection being a phone connection;

the second communication connection configured for doing a first step of initiating the data transmission from the first computer to at least the second computer by initiating access authorization to the first computer by the second computer, realized via the very first data transfer of an authorization request to the first computer, with the very first data transfer of an authorization request being a call from the second computer with a fixed phone number to the first computer;

equipment selected from the group consisting of the second computer and another communication appliance provided for sending a call signal through the second communication connection for initiating on the first computer the access authorization or the data transmission from the first computer to at least the second computer; and the first computer for checking a phone number of the incoming phone call from said second communication connection.

* * * * *